United States Patent
Virkar et al.

(10) Patent No.: US 6,326,096 B1
(45) Date of Patent: Dec. 4, 2001

(54) SOLID OXIDE FUEL CELL INTERCONNECTOR

(75) Inventors: Anil V. Virkar, Salt Lake City; Diane M. England, Murray; Karun Mehta, Salt Lake City; Jai-Woh Kim, Salt Lake City; Kuan-Zong Fung, Salt Lake City, all of UT (US)

(73) Assignee: Gas Research Institute, Chicago, IL (US)

( * ) Notice: Subject to any disclaimer, the term of this patent is extended or adjusted under 35 U.S.C. 154(b) by 0 days.

(21) Appl. No.: 09/018,786

(22) Filed: Feb. 4, 1998

(51) Int. Cl.⁷ .............................. H01M 8/02; H01M 8/12
(52) U.S. Cl. ................................. 429/30; 429/34
(58) Field of Search .................... 429/30, 31, 34

(56) References Cited

U.S. PATENT DOCUMENTS

| | | | |
|---|---|---|---|
| 4,225,654 | 9/1980 | Tajima et al. | 429/34 |
| 4,514,475 | 4/1985 | Mientek | 429/35 |
| 4,555,453 | 11/1985 | Appleby | 429/41 |
| 4,781,996 * | 11/1988 | Toriya et al. | 429/36 |
| 4,874,678 | 10/1989 | Reichner | 429/30 |
| 4,888,254 | 12/1989 | Reichner | 429/31 |
| 4,950,562 | 8/1990 | Yoshida et al. | 429/32 |
| 4,997,727 | 3/1991 | Bossel | 429/33 |
| 5,034,288 | 7/1991 | Bossel | 429/32 |
| 5,049,456 | 9/1991 | Matsuhiro et al. | 429/12 |
| 5,185,219 | 2/1993 | Ishihara et al. | 429/31 |
| 5,227,256 * | 7/1993 | Marianowski et al. | 429/16 |
| 5,258,240 | 11/1993 | Di Croce et al. | 429/31 |
| 5,273,838 | 12/1993 | Draper et al. | 429/31 |
| 5,411,767 | 5/1995 | Soma et al. | 427/453 |
| 5,480,739 | 1/1996 | Kawasaki et al. | 429/33 |
| 5,496,655 | 3/1996 | Lessing | 429/34 |

FOREIGN PATENT DOCUMENTS 0 410 166 * 1/1991 (EP) .

OTHER PUBLICATIONS

Shackelford, James F. Introduction to Materials Science For Engineers, 3rd ed. Macmillan Publishing Co., p. 318, table titled "Alloy Designations for Some Common Superalloys", 1992 (no month).*

Shackelford, James F. Introduction to Materials Science For Engineers, 3rd ed. Macmillan Publishing Co., p. 315, Table Titled "Alloy Designations for Some Common Stainless Steels", 1992 (no month).*

Hawley's Condensed Chemical Dictionary (11th ed.), entry of "noble", p. 835, 1987 (no month).*

* cited by examiner

Primary Examiner—Stephen Kalafut
Assistant Examiner—Jonathan Crepeau
(74) Attorney, Agent, or Firm—Pauley Petersen Kinne & Fejer

(57) ABSTRACT

A solid oxide fuel cell interconnector having a superalloy metallic layer with an anode-facing face and a cathode-facing face and metal layer on the anode-facing face of the superalloy metallic layer. The metal layer is a metal which does not oxidize in a fuel atmosphere, preferably nickel or copper.

3 Claims, 5 Drawing Sheets

SOLID OXIDE FUEL CELL INTERCONNECTOR

BACKGROUND OF THE INVENTION

1. Field of the Invention

This invention relates to solid oxide fuel cells, in particular, interconnects comprising a superalloy and a metal which does not oxidize in the atmosphere of the fuel side of a solid oxide fuel cell, for example, nickel or copper for use in solid oxide fuel cells.

2. Description of Prior Art

It is well known that nickel is perfectly satisfactory as a constituent of an anode electrode in solid oxide fuel cells in which hydrogen, as well as reformed methane, is used as a fuel. It can be readily shown that, on the one hand, in the fuel atmosphere at the anode electrode, neither nickel oxide nor nickel carbide can form. Most superalloys, that is alloys which are resistant to oxidation at high temperatures, such as austenitic stainless steel and inconel, on the other hand, contain a significant amount of chromium. The partial pressure of oxygen at the anode electrode is usually high enough to form chromium oxide, $Cr_2O_3$. Although chromium oxide scale does not grow rapidly, its resistance is rather high and, thus, it is desirable that its thickness be as small as possible. In our work on fuel cell stack testing, we have observed that the oxide coating is usually thicker on the fuel side (anode side) than on the air side (cathode side) of the interconnector between cell units. We believe that this may be due to the fact that water formed by the electrochemical reaction of fuel and oxygen adversely affects the kinetics of oxide growth. We have, in fact, observed in our work that the resistance of the interconnector on the fuel side is actually greater than the resistance on the air side, both immediately after testing and at room temperature. The solid oxide fuel cell interconnectors of this invention address this issue by preventing an increase in net interconnector resistance by minimizing the formation of an oxide coating on the fuel side of the interconnector.

Solid oxide fuel cells, like other fuel cells, comprise an anode electrode, a cathode electrode, and an electrolyte disposed between the anode electrode and the cathode electrode. In contrast to other types of fuel cells, for example molten carbonate fuel cells, solid oxide fuel cells operate at relatively high temperatures, typically greater than about 800° C. Accordingly, the interconnector materials must be able to withstand said temperatures.

One solution to the problem of metallic interconnector oxidation in solid oxide fuel cells is taught, for example, by U.S. Pat. No. 4,950,562 which teaches a solid electrolyte type of fuel cell having an interconnector comprising a heat resistant alloy substrate coated on its surface with a composite metal oxide of the perovskite-type structure, that is $La_{1-x}M^1_xM^2O_3$ wherein $M^1$ is an alkaline earth metal, $M^2$ is Co, Fe, Mn, Ni or Cr and x is greater than or equal to zero and less than one. U.S. Pat. No. 5,411,767 teaches a method for producing interconnectors for electrically connecting unit cells of a solid electrolyte type fuel cell in which the interconnector material, a perovskite-complexed oxide, is thermally sprayed onto the surface of an electrode of a solid electrolyte type fuel cell by plasma thermal spraying. An interconnector made of lanthanum chromite or lanthanum oxide and chromium oxide doped with copper, zinc, calcium or strontium for a solid oxide fuel cell is taught by U.S. Pat. No. 5,480,739. See, also, U.S. Pat. No. 4,874,678 and U.S. Pat. No. 4,888,254, both of which teach interconnects of lanthanum chromite doped with calcium, strontium, or magnesium for use in connection with solid oxide electrolyte fuel cell stacks; U.S. Pat. No. 5,034,288 which teaches a solid electrolyte fuel cell stack comprising a metallic bipolar plate comprising a nickel-based alloy and coated on the oxygen side with a lanthanum/manganese perovskite applied by plasma spraying; U.S. Pat. No. 4,997,727 which teaches an interconnect for a solid electrolyte fuel cell stack constructed of Inconel X; and U.S. Pat. No. 5,496,655 which teaches a bipolar interconnector manufactured from NiAl or $Ni_3Al$ coated with strontium or calcium-doped lanthanum chromite.

In contrast thereto, the interconnects for solid oxide fuel cells in accordance with this invention are substantially lower in cost while providing high conductivity relative to other known interconnects.

SUMMARY OF THE INVENTION

It is an object of this invention to provide a solid oxide fuel cell which utilizes a heat-resistant, electrically conductive part suitable for use as an interconnector between adjacent fuel cell units in a fuel cell stack.

It is another object of this invention to provide an interconnector for a solid oxide fuel cell stack which substantially avoids the formation of surface oxides on the fuel side of said interconnectors.

These and other objects of this invention are achieved by a solid oxide fuel cell system comprising a plurality of fuel cell units, each said fuel cell unit comprising an anode, a cathode, and an electrolyte separating the anode from the cathode, and an interconnector structure separating the anode of one of the fuel cell units from the cathode of an adjacent fuel cell unit. The interconnector structure in accordance with this invention comprises a superalloy layer and a metal layer, the metal layer being disposed on an anode-facing face of the superalloy layer and comprising a metal which does not oxidize to any significant extent in the atmosphere of the anode side of the interconnector. Such metals are preferably selected from the group consisting of copper, nickel, silver, gold, platinum, palladium, iridium, and rhodium. Due to the relative costs of these metals, nickel and copper, being the least expensive, are particularly preferred with copper being preferred over nickel due to the fact that it is more "noble" than nickel, that is, more resistant to oxidation than nickel.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
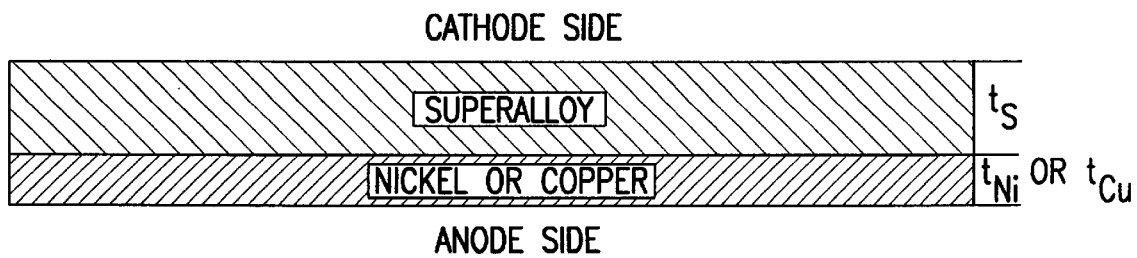
FIG. 1 is a cross-sectional view of a solid oxide fuel cell interconnector in accordance with one embodiment of this invention.

The requirements for an interconnector for a solid electrolyte type of fuel cell include stability in an oxidizing and reducing atmosphere at high temperatures, good electrical conductivity in an oxidizing and reducing atmosphere at high temperatures, a coefficient of thermal expansion close to that of an oxide ion conductive solid, and a coefficient of thermal expansion close to that of an electrode material. By high temperature, we mean temperatures at least as high as about 700° C.

Until now, metals or electrically conductive ceramics have been used for interconnectors in solid electrolyte fuel cells. However, when metallic interconnectors are used at temperatures of 600° C. or higher, oxides are formed on their surfaces, giving rise to considerably increased contact resistance and, thus, increased power losses due to resistance, resulting in deterioration of the fuel cell characteristics. Electrically conductive ceramics which satisfy the requirements for an interconnector for solid electrolyte type fuel cells are perovskite-type oxides having the formulation $La_{1-x}M^1_xM^2O_3$, wherein $M^1$ is Sr, Ca, or Ba and $M^2$ is Co, Fe, Mn, Ni, or Cr. Unfortunately, although some of these ceramics are electrically conductive, their electrical resistance is higher than metals and, thus, they are not ideal. In addition, such ceramic interconnectors are brittle, requiring extra machining in order to provide the requisite surface matings with other fuel cell components; and they are unable to withstand significant thermal shock. As a result, metallic interconnectors which are flexible and which are able to withstand thermal shock are preferred.

As previously stated, metallic interconnectors suitable for use in solid oxide fuel cells must be able to withstand temperatures at least as high as about 700° C. for extended periods of time, preferably corresponding to the service life of the fuel cell. More particularly, the metallic interconnectors for a solid oxide fuel cell stack must be able to withstand temperatures in excess of 700° C. for at least 5,000 hours and preferably greater. Metals that satisfy these criteria which, thus, are suitable for use as interconnectors in solid oxide fuel cells are superalloys, that is metal alloys typically comprising iron, nickel, chromium, and manganese. However, when exposed to the fuel atmosphere of a solid oxide fuel cell, the chromium in such superalloys oxidizes, forming $Cr_2O_3$ scale on the interconnector surface, thereby increasing the resistance through the interconnector.

We have found that by applying a layer of a metal to a superalloy interconnector on a side of said superalloy interconnector facing the anode of a fuel cell, we are able to prevent oxidation of the interconnector on the side of said interconnector facing the anode (the fuel side of the interconnector). In particular, the interconnector for a solid oxide fuel cell stack in accordance with this invention comprises a superalloy metallic layer having an anode-facing face and a cathode-facing face, and a metal layer on the anode-facing face of the superalloy metallic layer, said metal layer comprising a metal which is not significantly oxidized in the fuel atmosphere of the anode side in a solid oxide fuel cell stack. In accordance with one preferred embodiment of this invention, the metal is selected from the group consisting of nickel, copper, silver, gold, platinum, palladium, iridium, and rhodium. Due to considerations of cost, nickel and copper are particularly preferred metals with copper being preferred over nickel due to the fact that it is more "noble," that is, it oxidizes less, than nickel in the fuel atmosphere of a solid oxide fuel cell.

From thermodynamic tables, the standard free energy for the reaction:

$$2Cr(s)+3/2O_2(g) \rightarrow Cr_2O_3(s) \qquad (1)$$

is given by $\Delta G^0_i = -1,120,300+260T$ j/mol. The equilibrium partial pressure of oxygen for this reaction at solid oxide fuel cell operating temperatures, about 800° C., is given by $p_{O_2} \approx 5.0 \times 10^{-28}$ atmospheres, which is well below the partial pressure of oxygen at the anode electrode of the fuel cell. As a result, formation of chromium oxide in the fuel atmosphere occurs. By comparison, the standard free energy for the oxidation of nickel to nickel oxide, that is for the reaction:

$$2Ni(s)+O_2(g) \rightarrow 2NiO(s) \qquad (2)$$

is given by $\Delta G^0_{ii} = -489,100+197T$ j/mol(per two moles of the oxide). The partial pressure of oxygen for the nickel/nickel oxide equilibrium is given by $p_{O_2} \approx 3.0 \times 10^{-14}$ atmospheres, which is well above the partial pressure of oxygen at the anode. As a result, nickel remains metallic, that is, it does not oxidize in the fuel atmosphere of the fuel cell.

Similarly, the standard free energy for the oxidation of copper in accordance with the following reaction:

$$2Cu(s)+1/2O_2(g) \rightarrow Cu_2O(s) \qquad (3)$$

is given by $\Delta G^0_{iii} = -169,000+7.12T\ln T+123T$ j/mol. At 800° C., the corresponding partial pressure of oxygen for the copper/copper oxide equilibrium is given by $p_{O_2} \approx 1.6 \times 10^{-9}$ atmospheres, about five orders of magnitude higher than for the nickel/nickel oxide equilibrium. Thus, in accordance with a particularly preferred embodiment of this invention, the interconnector for a solid oxide fuel cell comprises a superalloy layer, the anode facing side of which is coated with a layer of copper or nickel.

The metal layer on the interconnector can be deposited in any number of ways including electroplating, electroless plating, and sputtering. It is also possible to hot roll foils of the metal and superalloy.

FIG. 1 shows a cross-sectional view of an interconnector for a solid oxide fuel cell in accordance with one embodiment of this invention wherein the face of the superalloy has an anode-facing face which is coated with a nickel or copper cladding. The thicknesses of the superalloy and nickel or copper coating are $t_S$, $t_{Ni}$ (or $t_{Cu}$), respectively. In accordance with a particularly preferred embodiment of this invention, the thickness of the nickel or copper layer is in the range of about 5 $\mu$m to about 100 $\mu$m. However, any thickness of nickel or copper which insures that metallic interdiffusion does not occur over the service life of the fuel cell, which could otherwise cause the migration of chromium to the anode side of the fuel cell stack, is acceptable. We believe that at relatively low temperatures, such as below about 800° C., and preferably around 650° C., metallic interdiffusion is all but frozen. However, such is not the case above about 800° C.

Suitable superalloys for use in connection with the interconnector of this invention include INCONELS® HAYNES® alloys, HASTELLOYS®, and austenitic stainless steels.

EXAMPLE

Stack testing was conducted with copper-plated Haynes 230 interconnectors in accordance with this invention. The initial step was the fabrication of corrugated anode-supported cells. NiO and 8 mol. % yttria stabilized zirconia (YSZ) powders were mixed and ball-milled in ethanol for 24 hours. After the well-mixed slurry was dried under vacuum, the powder was die-pressed using corrugated dies such that the flow pattern was in a cross-flow arrangement. The amount of powder per plate was 45 g, and pressed dimensions were about 7 cm×7 cm in lateral dimensions and 4 mm in thickness after uniaxial pressing. The corrugated plates were bisqued in air at 1000° C. for 1 hour. A slurry of YSZ in either ethylene glycol or ethanol was made with a ratio of 2 g YSZ per 10 ml ethylene glycol. The NiO+YSZ corrugated plates were subsequently painted (or spray-coated) with the YSZ slurry. The corrugated plates were then sintered in air at 1400° C. for two hours.

$La_{0.8}Sr_{0.2}MnO_{(3-x)}$(LSM) powder, with a stoichiometric mixture of MnO, $SrCO_3$ and $La_2O_3$, was prepared by calcining in air at 1000° C. for eight hours. YSZ powder was also calcined in air at 1200° C. for one hour to coarsen the particle size. The calcined LSM and YSZ powders were then mixed in ethanol in a ratio of 50/50 weight percent. After the powder mixture was dried, the powder was mixed in ethylene glycol in a ratio of 5 g LSM+YSZ to 5 ml ethylene glycol to make a thick paste. The paste was painted onto the sintered corrugated plates and the plates heated at 400° C. The coating of paste and subsequent heating was repeated until a thickness of LSM+YSZ in the range of about 40–60 $\mu$ was obtained. The LSM powder was mixed in ethylene glycol with the ratio 5 g LSM to 5 ml ethylene glycol to prepare a thick paste. The paste was painted onto the LSM+YSZ painted corrugated plates and heated to about 160° C. This procedure was repeated until a thickness of LSM in the range of about 150–200 $\mu$m was obtained. Achieving a high enough thickness is important for minimizing the sheet resistance. The painted, corrugated plates were then heated in air at 1210° C. for one hour. The maximum thickness of the cells, the thickness varying due to the corrugations, was about 3 mm.

For formation of the interconnector of this invention, Haynes 230 commercial alloy foils of 5 mil (125 $\mu$m) thickness were obtained from a vendor and subsequently electroplated with copper and nickel (separately). The foils were electroplated on one side. The thickness of the nickel plating was about 1 mil. In the case of copper-plated foils, an initial coat of nickel was deposited by plating to improve the adherence of copper. The thickness of the copper plating was about 1.5–2 mils. The foils were cut in approximately 5 cm×5 cm pieces and inserted into the fuel cell stack with the plated side exposed to the fuel (hydrogen) atmosphere.

A stack was assembled using four cells and three copper-plated interconnector foils. End plates which serve as current collectors were also made of Haynes 230 alloy. The diameter of the current collector rod of this cell stack was 1.2 cm. Three voltage probes were introduced, one attached to each interconnector. The stack was secured inside a metallic manifold with mica gaskets as sealants. In order to improve the sealing, the stack was spring-loaded such that the springs were outside the hot zone of the furnace. The stack was tested at 800° C. with humidified hydrogen as the fuel and air as the oxidant. The active area of the stack was estimated to be between about 75 and 80 $cm^2$.

Figure 2:
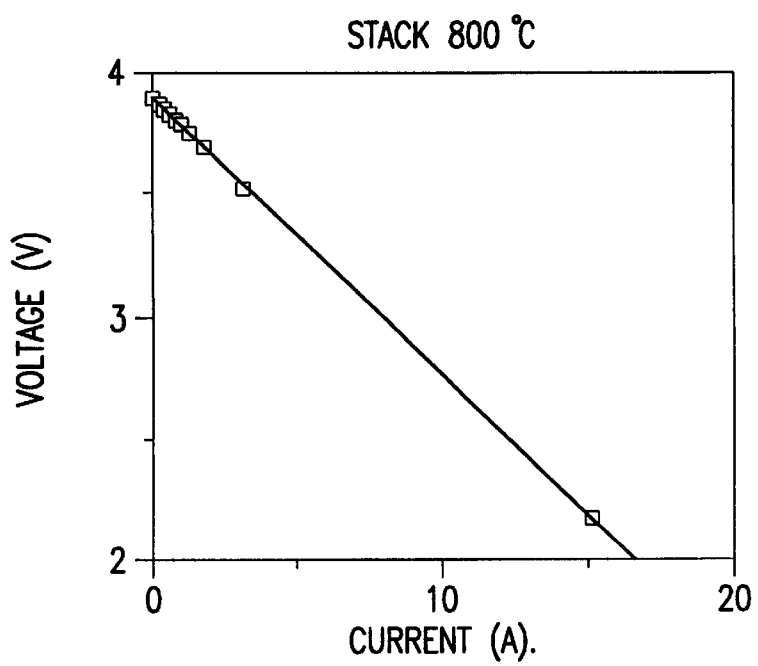
FIG. 2 is a diagram showing voltage versus current for a four-cell stack.

FIGS. 2, 3, and 4(a)–4(d) show the results of the stack test. FIG. 2 is a diagram showing voltage vs. current for the four cell stack. The open circuit voltage (OCV) was about 3.9 volts, which theoretically should be about 4.3 volts. The fact that the open circuit voltage was lower than the theoretical value indicates that there was some gas leakage.

Figure 3:
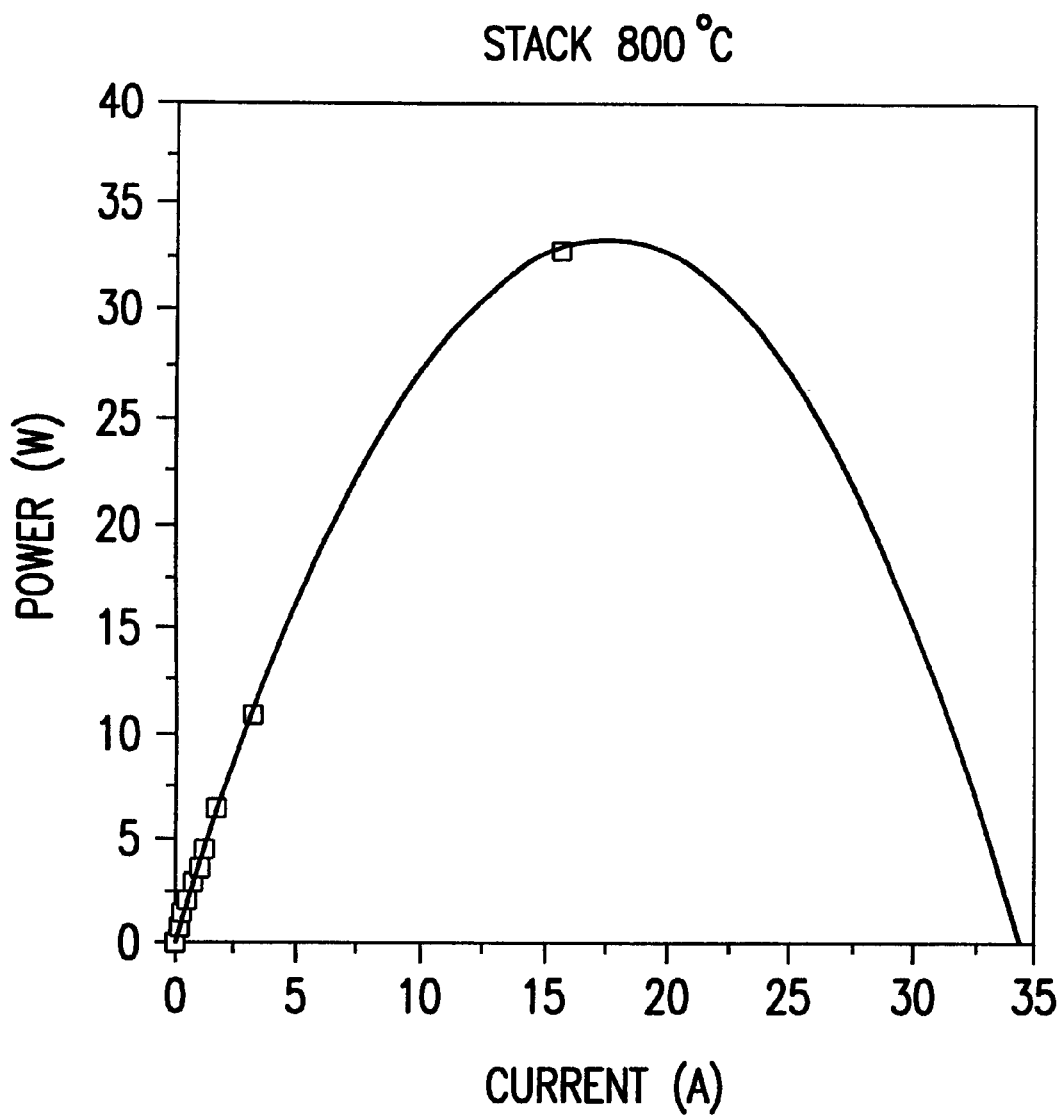
FIG. 3 is a diagram showing power versus current for a four-cell stack.

FIG. 3 is a diagram showing power vs. current for the four cell stack. The maximum power was about 33 watts with a short circuit current of 34 amps. The short circuit current density was greater than or equal to about 1.7 amps/$cm^2$.

Figure 4A:
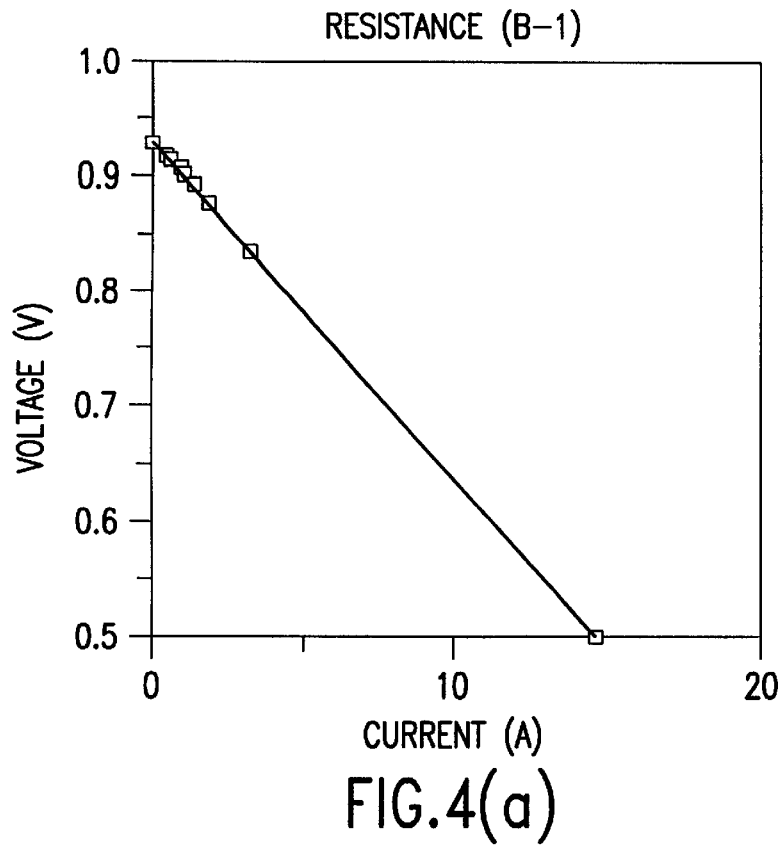
FIG. 4(a) is a diagram showing voltage versus current for the bottom current collector—cell 1 of the cell stack.
Figure 4B:
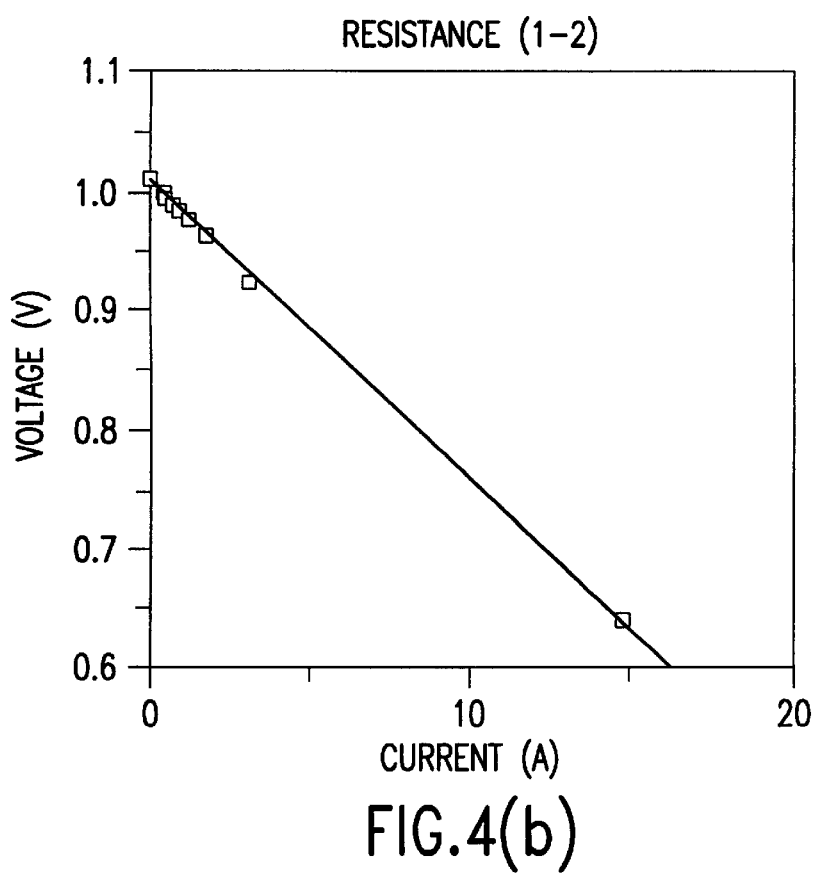
FIG. 4(b) is a diagram showing voltage versus current for cells 1–2 of the cell stack.
Figure 4C:
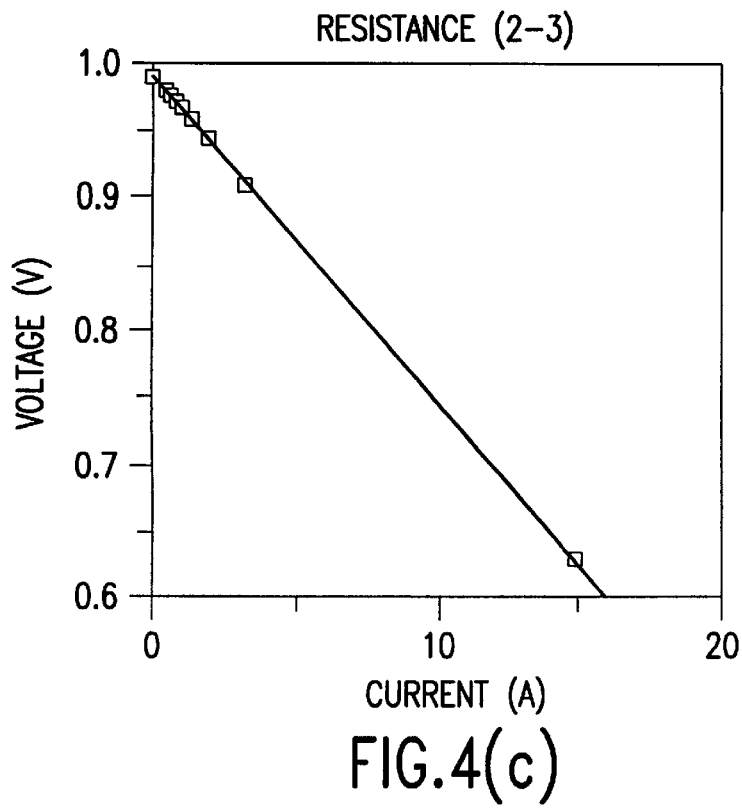
FIG. 4(c) is a diagram showing voltage versus current for cells 2–3 of the cell stack.
Figure 4D:
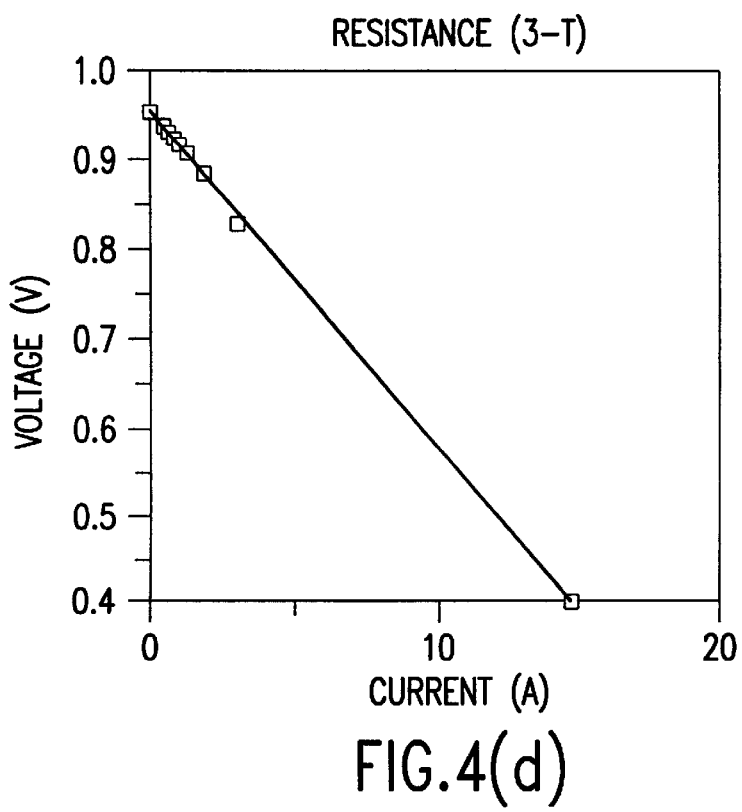
FIG. 4(d) is a diagram showing voltage versus current for cell 3—top current collector of the cell stack.

FIGS. 4(a)–4(d) show the voltage vs. current traces for each cell/interconnector repeat unit as measured from the probes. FIG. 4(a) corresponds to the voltage vs. current for bottom current collector-cell 1, FIG. 4(b) corresponds to the voltage vs. current for cell 1–cell 2, FIG. 4(c) corresponds to the voltage vs. current for cell 2–cell 3, and FIG. 4(d) corresponds to the voltage vs. current for cell 3—top current collector. It should be noted that for the two central fuel cell units, the net area specific resistance, which includes the cell and the interconnector, is about 0.5 $\Omega cm^2$, despite a cell thickness of 3 mm. The area specific resistance of the end units is somewhat larger due to a poor contact between the cell and the end plate.

Figure 5:
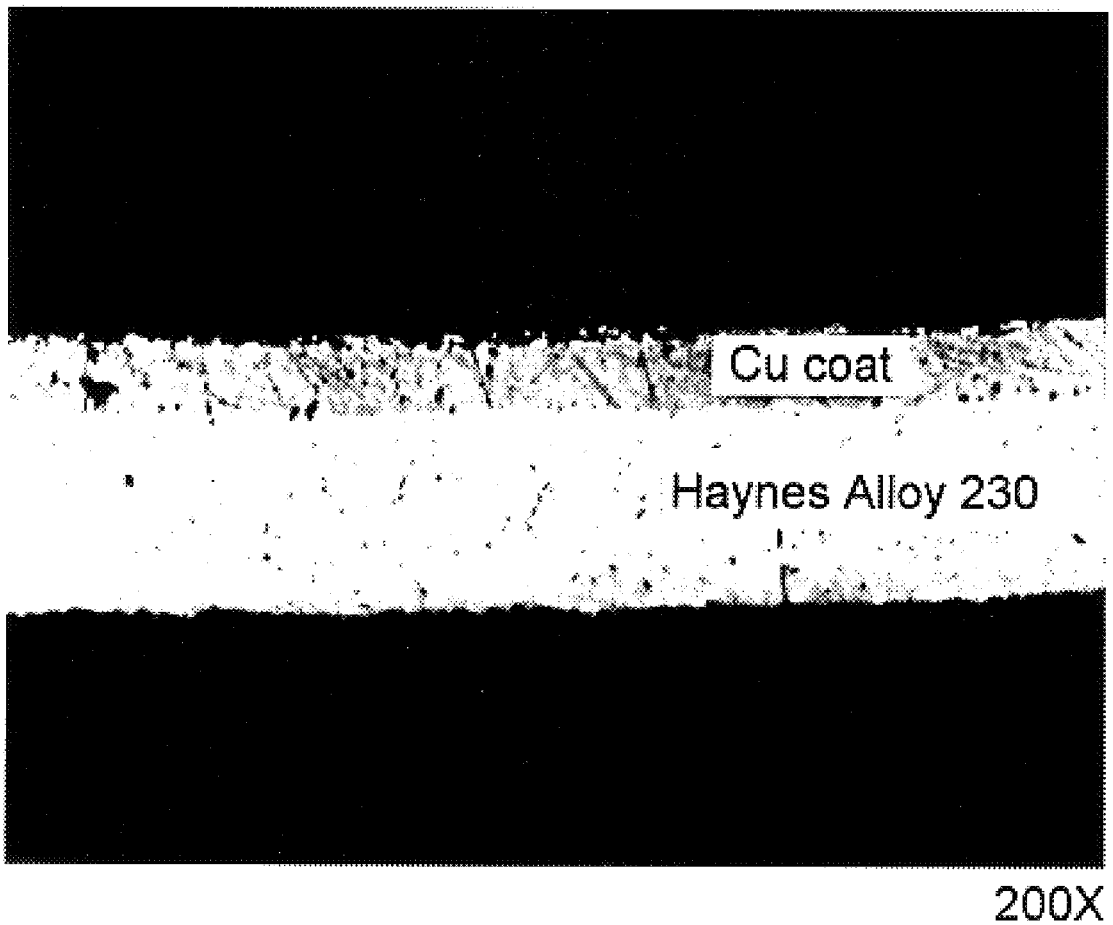
FIG. 5 is an optical micrograph of a cross-section of a copper-plated interconnector in accordance with one embodiment of this invention after completion of a fuel cell stack test.

FIG. 5 is an optical micrograph of a cross-section of the copper-plated interconnector after the stack test. Note that there is no oxide layer on the copper-side or at the interface between the copper plating and the Haynes 230 superalloy foil and there is no debonding or peeling off.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a solid oxide fuel cell system comprising a plurality of fuel cell units, each said fuel cell unit comprising an anode, a cathode, and an electrolyte separating said anode from said cathode, and an interconnect structure separating said anode of one said fuel cell unit from said cathode of an adjacent said fuel cell unit, the improvement comprising:

said interconnect structure comprising a Ni-based superalloy layer comprising Ni, Fe, Cr and Mn and a metal layer, said metal layer disposed on an anode-facing face of said Ni-based superalloy layer and comprising a metal which is not significantly oxidized in an anode side atmosphere, said metal comprising nickel.

2. A solid oxide fuel cell system in accordance with claim 1, wherein said metal layer is sufficiently thick so as to prevent metallic interdiffusion under cell operating conditions.

3. A solid oxide fuel cell system in accordance with claim 2, wherein said metal layer has a thickness in a range of about 25 microns to about 125 microns.

* * * * *